(12) United States Patent
Kim et al.

(10) Patent No.: US 11,201,010 B2
(45) Date of Patent: Dec. 14, 2021

(54) MULTILAYER CAPACITOR AND MANUFACTURING METHOD FOR THE SAME

(71) Applicant: SAMSUNG ELECTRO-MECHANICS CO., LTD., Suwon-si (KR)

(72) Inventors: Yeang Jun Kim, Suwon-si (KR); Gam Woo Kim, Suwon-si (KR); Jae Won Kim, Suwon-si (KR); Jin Kyung Joo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 79 days.

(21) Appl. No.: 16/537,845

(22) Filed: Aug. 12, 2019

(65) Prior Publication Data
US 2020/0234880 A1    Jul. 23, 2020

(30) Foreign Application Priority Data
Jan. 21, 2019    (KR) ........................ 10-2019-0007517

(51) Int. Cl.
| | |
|---|---|
| *H01G 4/012* | (2006.01) |
| *H01G 4/12* | (2006.01) |
| *H01G 4/228* | (2006.01) |
| *H01G 4/30* | (2006.01) |

(52) U.S. Cl.
CPC .............. *H01G 4/012* (2013.01); *H01G 4/12* (2013.01); *H01G 4/228* (2013.01); *H01G 4/30* (2013.01)

(58) Field of Classification Search
CPC .......... H01G 4/012; H01G 4/12; H01G 4/228; H01G 4/30
See application file for complete search history.

(56) References Cited

U.S. PATENT DOCUMENTS

| | | | | |
|---|---|---|---|---|
| 9,812,259 | B2 * | 11/2017 | Lee ........................ | H01G 4/248 |
| 2004/0107555 | A1 * | 6/2004 | Hattori ..................... | H01G 4/30 29/25.42 |
| 2016/0196918 | A1 * | 7/2016 | Hong ..................... | H01G 4/232 174/260 |

FOREIGN PATENT DOCUMENTS

| | | |
|---|---|---|
| JP | 2779896 B2 | 7/1998 |
| KR | 10-2013-0102277 A | 9/2013 |

* cited by examiner

*Primary Examiner* — Nathan Milakovich
(74) *Attorney, Agent, or Firm* — Morgan, Lewis & Bockius LLP (57) ABSTRACT

A multilayer capacitor includes a capacitor body including first and sixth surfaces; including an active region including a plurality of dielectric layers and a plurality of first and second internal electrodes alternately disposed with the dielectric layers interposed therebetween, and cover regions disposed on an upper surface and a lower surface of the active region; and having one end of each of the first and second internal electrodes exposed through the third and fourth surfaces, respectively; and first and second external electrodes respectively disposed on the third and fourth surfaces of the capacitor body. Each of the cover regions has a plurality of holes.

5 Claims, 4 Drawing Sheets

MULTILAYER CAPACITOR AND MANUFACTURING METHOD FOR THE SAME

CROSS-REFERENCE TO RELATED APPLICATION

This application claims benefit of priority to Korean Patent Application No. 10-2019-0007517 filed on Jan. 21, 2019 in the Korean Intellectual Property Office, the disclosure of which is incorporated herein by reference in its entirety.

TECHNICAL FIELD

The present disclosure relates to a multilayer capacitor and a manufacturing method for the same.

BACKGROUND

Multilayer capacitors may be used in various electronic devices because they may be implemented to have a small size and high capacitance.

In recent years, as the proportion of multilayer capacitors in electric/electronic products and IT products has increased, demand of performance required by customers have been increasing.

Particularly, as the capacitance of the multilayer capacitor increases, it may be necessary to include a large number of internal electrodes which are small in size. Thus, defects related to cracks in the multilayer capacitor may increase.

In particular, cracks generated between the active region and the cover region of the capacitor body are considered to be a typical factor that may cause a problem in the reliability of products, and therefore improvements may be required.

SUMMARY

An aspect of the present disclosure is to provide a multilayer capacitor capable of reducing cracks generated between an active region and a cover region, and a manufacturing method thereof.

According to an aspect of the present disclosure, a multilayer capacitor includes a capacitor body including a first surface and a second surface opposing each other, a third surface and a fourth surface connected to the first and second surfaces and opposing each other, and a fifth surface and a sixth surface connected to the first and second surfaces, connected to the third and fourth surfaces, and opposing each other; including an active region including a plurality of dielectric layers and a plurality of first and second internal electrodes alternately disposed with the dielectric layers interposed therebetween, and cover regions disposed on an upper surface and a lower surface of the active region; and having one end of each of the first and second internal electrodes exposed through the third and fourth surfaces, respectively; and first and second external electrodes respectively disposed on the third and fourth surfaces of the capacitor body. Each of the cover regions has a plurality of holes.

In an aspect of the present disclosure, the plurality of holes may be a gas discharge portion in each of the cover regions.

In an aspect of the present disclosure, the multilayer capacitor may further include outer covers respectively disposed on an upper surface and a lower surface of each of the cover regions.

In an aspect of the present disclosure, among the outer covers and the cover regions, only each of the cover regions may have the plurality of holes.

In an aspect of the present disclosure, a density of holes in each of the cover regions may be greater than a density of holes in each of the outer covers.

In an aspect of the present disclosure, a density of holes in each of the cover regions may be greater than a density of holes in the plurality of dielectric layers in the active region.

In an aspect of the present disclosure, each of the first and second external electrodes may include a first connection portion and a second connection portion respectively disposed on third and fourth surfaces of the capacitor body and respectively connected to the first and second internal electrodes; and a first band portion and a second band portion respectively extending from the first and second connection portions to a portion of the first surface of the capacitor body.

According to another aspect of the present disclosure, a manufacturing method of a multilayer capacitor includes a first step of forming a plurality of electrode patterns including a first conductive pattern and a second conductive pattern on a first ceramic sheet including a first binder at regular intervals in a longitudinal direction; a second step of stacking the first ceramic sheet on which the electrode patterns are formed, in plural, such that the first and second conductive patterns are alternated with each other in a thickness direction to prepare a first stacked body; a third step of stacking a second ceramic sheet including the first binder and a second binder, having a thermal decomposition temperature lower than that of the first binder and used in the electrode pattern, are stacked on upper and lower surfaces of the first stacked body, to prepare a second stacked body having a cover region; a fourth step of cutting and firing each region of the second stacked body corresponding to a single capacitor, to prepare a capacitor body, in which a portion having the second conductive pattern with reference to a cut surface of the electrode patterns becomes a second internal electrode exposed from one end surface of the second stacked body, a portion having the first conductive pattern with reference to another cut surface of the electrode patterns becomes a first internal electrode exposed from another other end surface of the second stacked body, and the first and second internal electrodes are alternately exposed from both end surfaces of the second stacked body; and a fifth step of forming first and second external electrodes on both end surfaces of the capacitor body to be respectively electrically connected to the exposed portions of the first and second internal electrodes. In the fourth step, the cover region is configured to perform a reaction with and remove the second binder, during firing, to form a plurality of holes in a space occupied by the second binder, and to discharge gas remaining in the first binder through the plurality of holes.

In an aspect of the present disclosure, the manufacturing method may further include a step of, after the third step, further stacking the first ceramic sheet in plural on an upper surface of an upper cover region, and further stacking the first ceramic sheet in plural on a lower surface of a lower cover region, to form outer covers, respectively.

In an aspect of the present disclosure, in the third step, the second ceramic sheet may have the content of the second binder greater than the content of the first binder.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, preferred embodiments of the present disclosure will be described with reference to the accompanying drawings.

However, embodiments of the present disclosure can be modified into various other forms, and the scope of the present disclosure is not limited to the embodiments described below.

Further, embodiments of the present disclosure are provided to more fully describe the present disclosure to those skilled in the art.

Shapes and sizes of elements in the drawings may be exaggerated for clarity of description.

In addition, the elements denoted by the same reference numerals in the drawings are the same elements.

Furthermore, throughout the specification, when an element is referred to as "comprising," it means that it can include other elements as well, without excluding other elements unless specifically stated otherwise.

When directions are defined to clearly explain an embodiment of the present disclosure, X, Y, and Z illustrated in the drawings represent a longitudinal direction, a width direction, and a thickness direction of a multilayer capacitor, respectively.

In this case, the Z direction may be used in the same concept as a stacking direction in which dielectric layers are stacked in an embodiment of the present disclosure.

Figure 1:
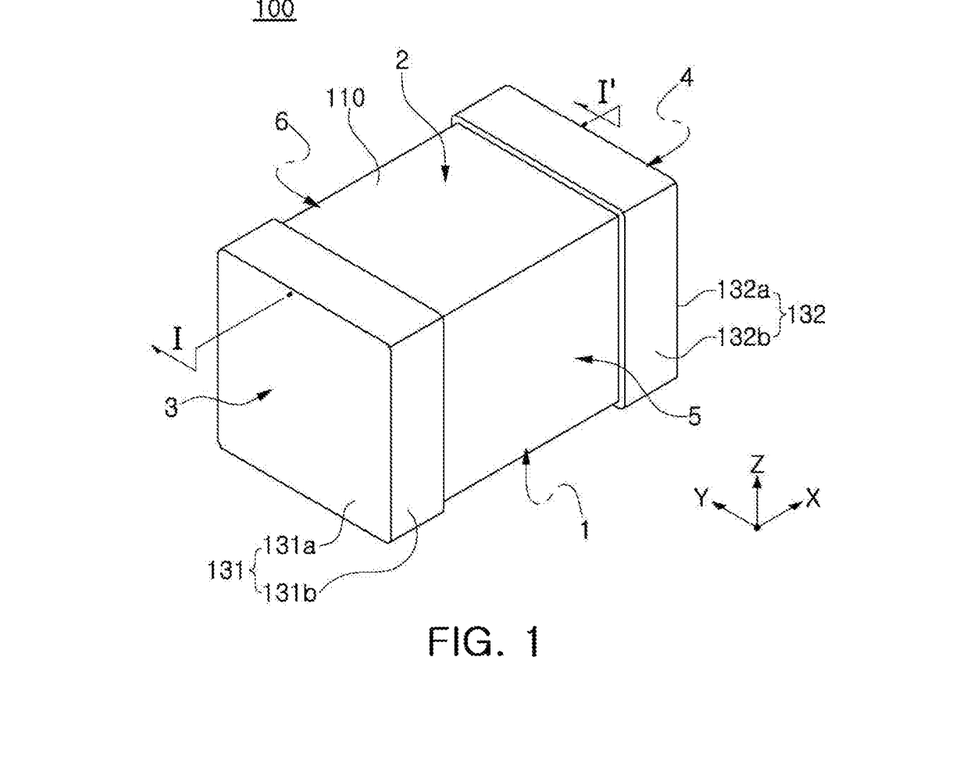
FIG. 1 is a perspective view schematically illustrating a multilayer capacitor according to an embodiment of the present disclosure.
Figure 2A:
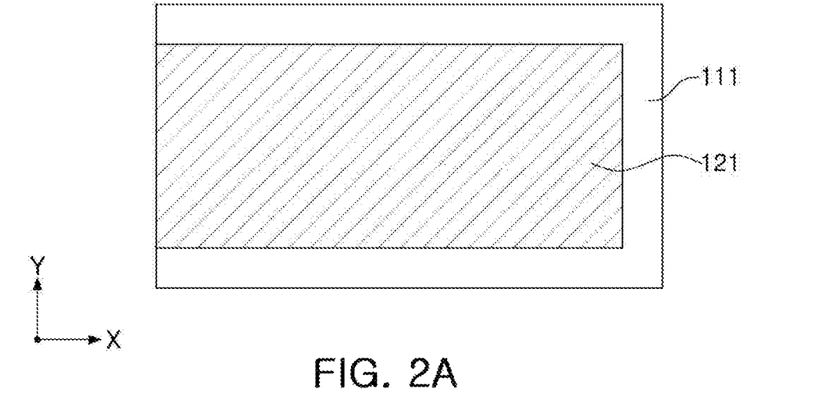
FIGS. 2A and 2B are plan views illustrating first and second internal electrodes of the multilayer capacitor of FIG. 1.
Figure 2B:
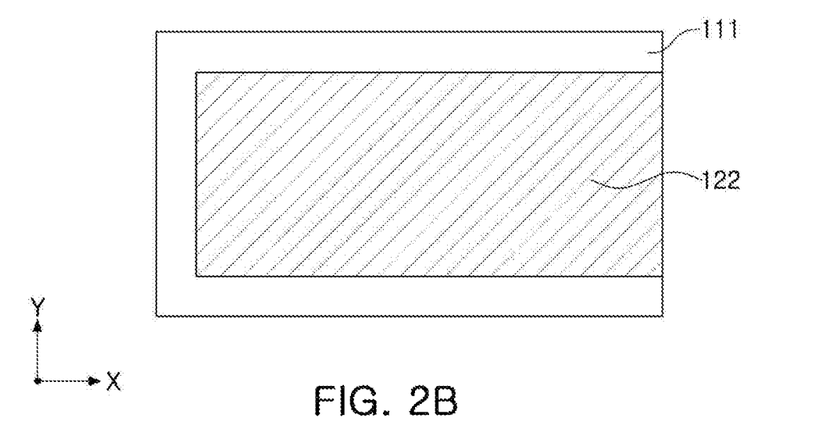
Figure 3:
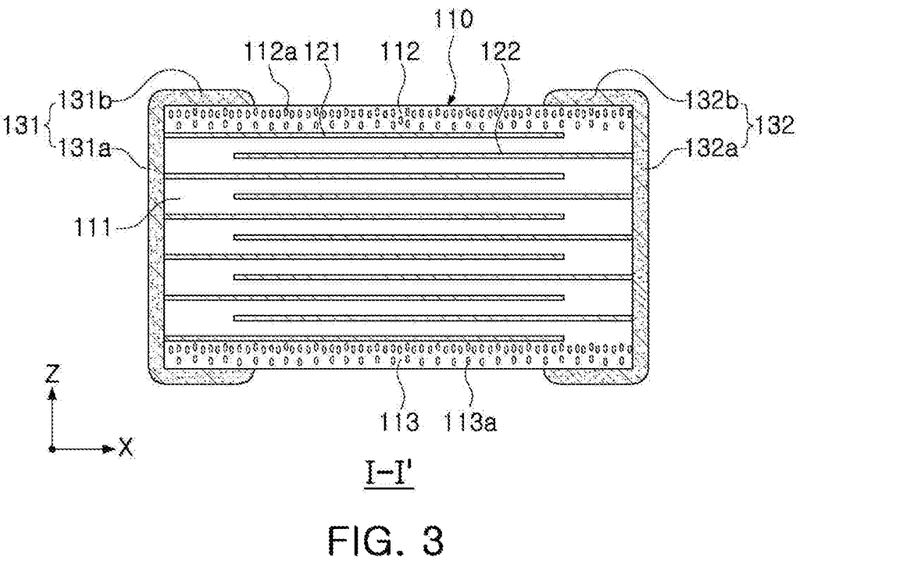
FIG. 3 is a cross-sectional view taken along line I-I' in FIG. 1.

FIG. 1 is a perspective view schematically illustrating a multilayer capacitor according to an embodiment of the present disclosure, FIGS. 2A and 2B are plan views illustrating first and second internal electrodes of the multilayer capacitor of FIG. 1, and FIG. 3 is a cross-sectional view taken along line I-I' in FIG. 1.

A multilayer capacitor of this embodiment will be described with reference to FIGS. 1 to 3.

A multilayer capacitor 100 of this embodiment may include a capacitor body 110, and first and second external electrodes 131 and 132 formed at both ends of the capacitor body 110 in an X direction.

The capacitor body 110 may be formed by stacking a plurality of dielectric layers 111 in a Z direction and then firing them. A boundary between the dielectric layers 111 of the capacitor body 110, adjacent to each other, may be integrated in a degree that it is difficult to identify the same without using a scanning electron microscope (SEM).

The capacitor body 110 may include a plurality of dielectric layers 111 and first and second internal electrodes 121 and 122 having alternating polarities alternately arranged in the Z direction with the dielectric layers 111 interposed therebetween.

In addition, the capacitor body 110 may include an active region serving as a portion contributing to capacitance formation of a capacitor, and cover regions 112 and 113 arranged as a margin portion on an upper surface and a lower surface of the active region in the Z direction, respectively.

Although a shape of the capacitor body 110 is not particularly limited, it may be in the form of a hexahedron. The capacitor body 110 may include a first surface 1 and a second surface 2 opposing each other in the Z direction, a third surface 3 and a fourth surface 4 connected to the first and second surfaces 1 and 2 and opposing each other in the X direction, and a fifth surface 5 and a sixth surface 6 connected to the first and second surfaces 1 and 2, connected to the third and fourth surfaces 3 and 4, and opposing each other in the Y direction.

The dielectric layer 111 may include a ceramic powder, for example, a $BaTiO_3$-based ceramic powder, or the like.

The $BaTiO_3$-based ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which Ca, Zr, or the like may be partially dissolved in $BaTiO_3$, but is not limited thereto.

Further, a ceramic additive, an organic solvent, a plasticizer, a binder, a dispersant, and the like, may be further added to the dielectric layer 111 together with the ceramic powder.

The ceramic additive may include, for example, a transition metal oxide or a transition metal carbide, a rare earth element, magnesium (Mg), aluminum (Al), or the like The first and second internal electrodes 121 and 122 may be electrodes to which voltages having different polarities may be applied, may be formed on the dielectric layer 111, and may be stacked in the Z direction. The first and second internal electrodes 121 and 122 may be alternately disposed inside of the body 110 in the Z direction to face each other, with one of the dielectric layers 111 interposed therebetween.

In this case, the first and second internal electrodes 121 and 122 may be electrically insulated from each other by the dielectric layers 111 interposed therebetween.

One end of the first and second internal electrodes 121 and 122 may be exposed to the third and fourth surfaces 3 and 4 of the capacitor body 110, respectively.

End portions of the first and second internal electrodes 121 and 122 alternately exposed to the third and fourth surfaces 3 and 4 of the capacitor body 110 may be in contact with and electrically connected to first and second external electrodes 131 and 132, to be described later, disposed in both end portions of the capacitor body 110 in the X direction, respectively.

When a predetermined voltage is applied to the first and second external electrodes 131 and 132, according to the above-described configurations, electric charges may be accumulated between the first and second internal electrodes 121 and 122, respectively.

In this case, capacitance of the multilayer capacitor 100 may be proportional to an overlapped area of the first and second internal electrodes 121 and 122 overlapping each other in the active region in the Z direction.

A material for forming the first and second internal electrodes 121 and 122 is not particularly limited, and may be formed by using a noble metal material such as platinum (Pt), palladium (Pd), a palladium-silver (Pd—Ag) alloy, or the like, and a conductive paste made of one or more of nickel (Ni) and copper (Cu).

In this case, the conductive paste may be printed by a screen printing method, a gravure printing method, or the like, but the present disclosure is not limited thereto.

A gas discharge portion may be formed in the cover regions 112 and 113 of this embodiment.

In this case, the gas discharge portion may be a plurality of holes 112a and 113a as void spaces formed while being distributed at a predetermined interval in the cover regions 112 and 113, respectively. A density of holes in each of the cover regions 112 and 113 may be greater than a density of holes in the dielectric layers 111 in the active region.

Since a second binder of the internal electrode is relatively low in a reaction temperature zone, a reaction may occur preferentially in the second binder during firing, and gas reacted in and discharged from the active region may be generally gathered. In this case, since a reaction temperature of organic materials in the active region may be higher than those in the cover region, the gas may be gathered. Therefore, cracks may be generated at an interface between the cover region and the active region which may be structurally weakest, as the firing continues.

For example, in this embodiment, since the gas inside of the capacitor body may be easily discharged externally through a gas discharge portion formed in cover regions in a step of firing a stacked body in a manufacturing process of the multilayer capacitor 100, probability of occurrence of cracks between the active region and the cover regions 112 and 113, which may be caused by expansion or contraction between the active region and the cover regions 112 and 113, may be greatly reduced.

The first and second external electrodes 131 and 132 may be provided with voltages of different polarities, may be disposed at both end portions of the capacitor body 110 in the X direction, and may be in contact with and electrically connected to exposed end portions of the first and second internal electrodes 121 and 122, respectively.

The first external electrode 131 may include a first connection portion 131a and a first band portion 131b.

The first connection portion 131a may be disposed on the third surface 3 of the capacitor body 110, and may be in contact with the externally exposed end portion of the first internal electrode 121 through the third surface 3 of the capacitor body 110, to function as an electrical connection between the first internal electrode 121 and the first external electrode 131.

The first band portion 131b may be a portion extending from the first connection portion 131a to a portion of the first surface 1 of the capacitor body 110.

In this case, the first band portion 131b may further extend from the first connection portion 131a to a portion of the second, fifth, and sixth surfaces 2, 5, and 6 of the capacitor body 110, to accomplish improvements of fixation strength, or the like.

The second external electrode 132 may include a second connection portion 132a and a second band portion 132b.

The second connection portion 132a may be disposed on the fourth surface 4 of the capacitor body 110, and may be in contact with the externally exposed end portion of the second internal electrode 122 through the fourth surface 4 of the capacitor body 110, to function as an electrical connection between the second internal electrode 122 and the second external electrode 132.

The second band portion 132b may be a portion extending from the second connection portion 132a to a portion of the first surface 1 of the capacitor body 110.

In this case, the second band portion 132b may further extend from the second connection portion 132a to a portion of the second, fifth, and sixth surfaces 2, 5, and 6 of the capacitor body 110, to accomplish improvements of fixation strength, or the like.

In addition, the first and second external electrodes 131 and 132 may further include a plated layer formed on each of surfaces thereof.

The plated layer may include first and second nickel (Ni) plated layers and first and second tin (Sn) plated layers respectively covering the first and second nickel plated layers.

Figure 4:
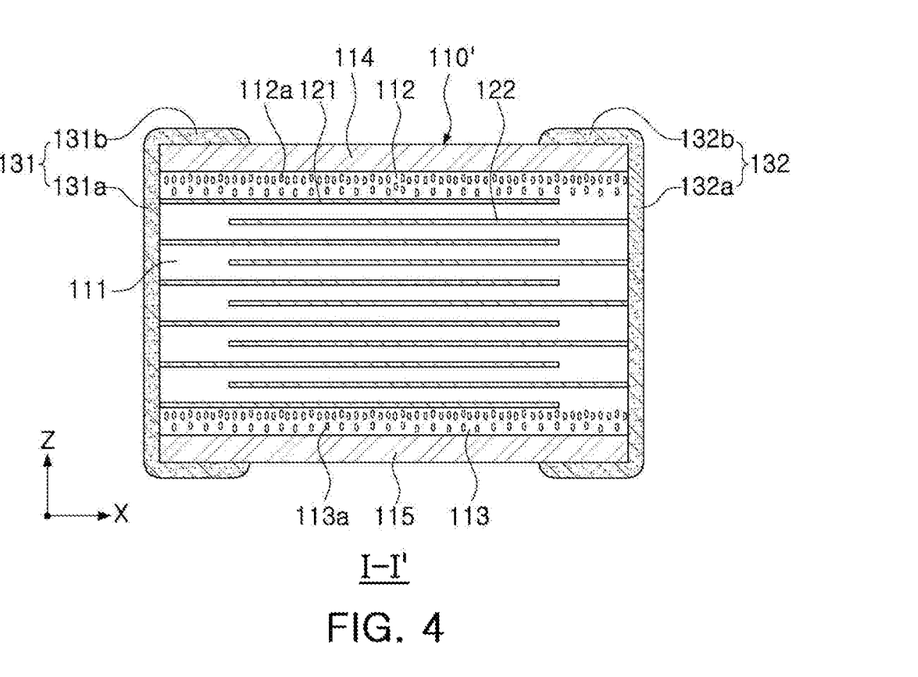
FIG. 4 is a cross-sectional view schematically illustrating another embodiment of the present disclosure.

FIG. 4 is a cross-sectional view schematically illustrating another embodiment of the present disclosure.

Referring to FIG. 4, outer covers 114 and 115 may be further respectively externally disposed on an upper surface and a lower surface of each of the cover regions 112 and 113 in a capacitor body 110'.

The outer covers 114 and 115 may be made of the same material as a dielectric layer 111 of an active region, and may not forma gas discharge portion and holes constituting the gas discharge portion therein. For example, a density of holes in each of the cover regions 112 and 113 may be greater than a density of holes in each of the outer covers 114 and 115.

In the case of the above embodiments, since the cover regions 112 and 113 may be porous due to the plurality of holes 112a and 113a, the holes 112a and 113a may be vulnerable to moisture resistance reliability of the capacitor body 110, which may thus be reduced.

As illustrated in FIG. 4, when the outer covers 114 and 115, which may be not provided with the holes constituting the gas discharge portion, may be further externally disposed on an upper surface and a lower surface of each of the cover regions 112 and 113 of the capacitor body 110', the humidity resistance of the capacitor body 110' may be prevented from being lowered by blocking moisture and foreign substances from entering from the outside.

A first band portion 131b of a first external electrode 131 may be disposed on an upper surface of an upper outer cover 114 and a lower surface of a lower outer cover 115, and a second band portion 132b of a second external electrode 132 may be disposed on an upper surface of an upper outer cover 114 and a lower surface of a lower outer cover 115.

Hereinafter, a manufacturing method of a multilayer capacitor of the present disclosure will be described.

First, a plurality of first ceramic sheets including a first binder may be provided.

The first ceramic sheets may be for forming an active region of a capacitor body. Slurry may be prepared by mixing a ceramic powder, a polymer, and a solvent, and the slurry may be coated on a carrier film by a method such as a doctor blade method, and may be dried, to be prepared in the form of a sheet having a thickness of several micrometers (μm).

Next, a first step of printing a conductive paste in a predetermined thickness on at least one surface of the first ceramic sheets, to form a plurality of electrode patterns at regular intervals in a longitudinal direction, may be performed.

In this case, the electrode patterns may include a first conductive pattern and a second conductive pattern.

As a printing method of a conductive paste for forming an electrode pattern, a screen printing method, a gravure printing method, or the like may be used, but the present disclosure is not limited thereto.

The electrode patterns may include a second binder having a thermal decomposition temperature lower than that of the first binder.

Next, a second step of alternatively stacking the plurality of first ceramic sheets in which the electrode patterns are formed, such that the first and second conductive patterns are alternated with each other in a Z direction, a thickness direction, and pressing the same in a Z direction, a stacking direction, to prepare a first stacked body, may be performed.

Next, a third step of respectively stacking at least one second ceramic sheet on upper and lower surfaces of the first stacked body, to prepare a second stacked body having a cover region, may be performed.

The second ceramic sheet may be formed by including the first binder included in the first ceramic sheet, and a second binder having a thermal decomposition temperature lower than that of the first binder and having the same composition as that of the second binder used in the electrode patterns.

In this case, the second ceramic sheet may be formed such that the content of the first binder is relatively larger than that of the second binder.

In a firing step to be described later, a portion of each of cover regions having the same reaction temperature as internal electrodes, e.g., a portion including the second binder may be preferentially reacted to have a lower reaction start temperature, compared to that of the cover region of a conventional multilayer capacitor having only the first binder, and at the beginning of the firing step, holes serving as a gas discharge portion may be formed therein.

In addition, the second binder may include a compatibilizer.

In this case, the compatibilizer may serve as increasing polymer binding between the first binder and the second binder, to compensate for lack of physical and chemical bonding between the first binder and the second binder, and closely adhering the first binder and the second binder to each other to make dispersion therein better.

After the third step of preparing the second stacked body, a step of further stacking a plurality of first ceramic sheets on the upper surface of the upper cover region, and further stacking a plurality of first ceramic sheets may be further stacked on the lower surface of the lower cover region, to further form each of outer covers, may be further performed. This step may be omitted to manufacture the multilayer capacitor shown in FIG. 3 according to one embodiment.

The outer covers may serve to prevent deterioration of moisture resistance reliability of the capacitor body.

Next, a fourth step of cutting and chipping each region of the second stacked body corresponding to a single capacitor along a cut line, and firing the same at a high temperature, to prepare a capacitor body having first and second internal electrodes, may be performed.

In this case, the capacitor body may be configured such that a portion having the second conductive pattern with reference to the cut surface of the electrode patterns becomes a second internal electrode exposed to one end surface of the second stacked body, a portion having the first conductive pattern with reference to the cut surface of the electrode patterns becomes a first internal electrode exposed to the other end surface of the second stacked body, and the first and second internal electrodes are alternately exposed to both end surfaces of the second stacked body.

In addition, in the capacitor body, the cover region may be configured to perform a reaction with and remove the second binder, during firing, to form a plurality of holes in a space occupied by the second binder, and to discharge gas remaining in the first binder through the holes. In this case, the gas remaining in the second binder may also be discharged through the holes.

Next, a fifth step of forming first and second external electrodes on both end surfaces of the capacitor body to be respectively electrically connected to the exposed portions of the first and second internal electrodes, may be performed.

In this case, as necessary, after the fifth step of forming the first and second external electrodes, surfaces of the first and second external electrodes may be plated by an electroplating process, or the like, to form first and second plated layers (not illustrated) may be formed.

As a material used for the plating step, nickel, tin, nickel-tin-alloy, or the like may be used, but the present disclosure is not limited thereto.

As necessary, first and second plated layers may be formed by sequentially stacking a nickel plated layer and a tin plated layer on the surfaces of the first and second external electrodes.

In the conventional multilayer capacitor, the dielectric layer and the internal electrodes may be stacked and pressed to forma stacked body. In this case, in the firing steps of the stacked body, since the binder component remains in the capacitor body, the active region and the cover regions are jointed to each other before sintering of the internal electrode or the dielectric layer occurs.

Since there is a difference in shrinking or expanding behavior of the internal electrodes and the dielectric layer during firing, the gas of the binder contained in the cover region and the active region may be concentrated and discharged toward an outermost internal electrode among the internal electrodes, to occur cracks between the active region and the cover regions.

Conventionally, a shrinkage ratio between the cover regions and the active region was evaluated on the basis of a composition to analyze crack generation PPM, and then a composition of the cover region was selected to produce a multilayer capacitor. However, this may be a troublesome step, and may also cause to deteriorate the production efficiency.

In this embodiment, in order to control a behavior during firing, a second binder may be included in a cover region, and the second binder may react and be removed in the same manner as that of the internal electrodes of the active region to form a plurality of holes in the cover regions of the multilayer capacitor during firing, and these holes may be configured to form a gas discharge portion.

As above, the gas remaining in the cover region and the gas in the active region may be discharged through the gas discharge portion, such that the conventional residual gas may be prevented from being concentrated and discharged toward the outermost internal electrode. Therefore, the occurrence of cracks between the active region and the cover regions may also be reduced.

Figure 5:
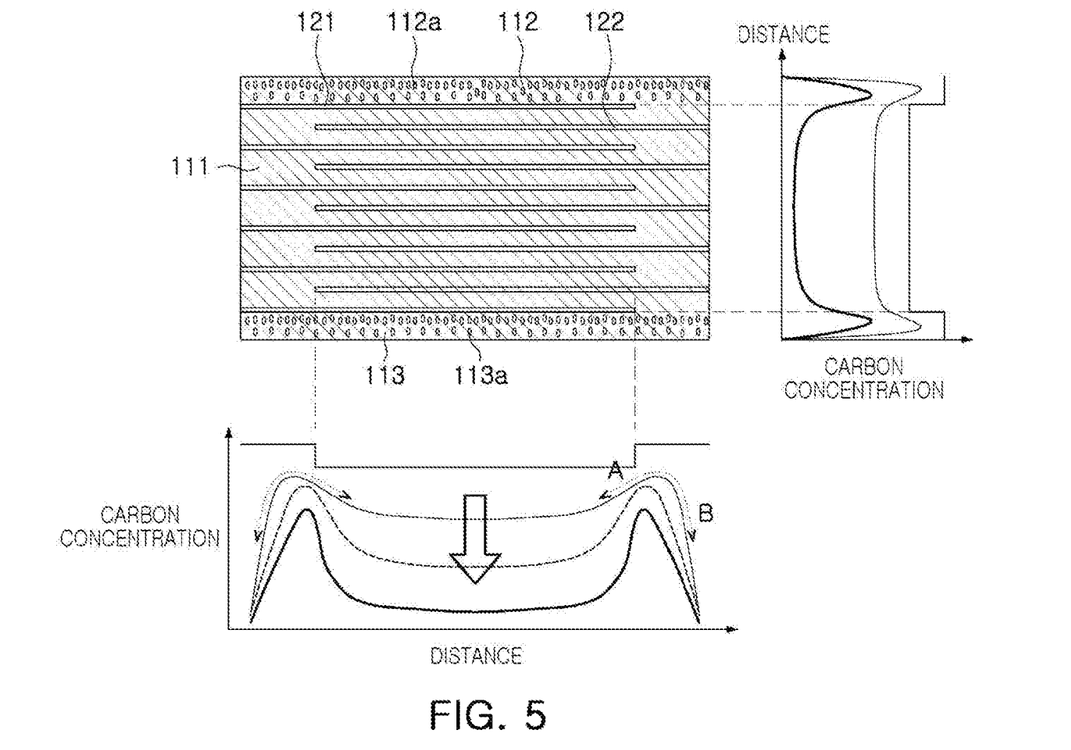
FIG. 5 is a graph illustrating distribution of remaining carbons of the capacitor body of FIG. 1.

FIG. 5 is a graph illustrating distribution of remaining carbon of the capacitor body of FIG. 1.

As illustrated in FIG. 5, it can be seen that, since a diffusion rate in a B direction may be faster than that in an A direction, remaining carbon may be concentrated at a point in which cover regions and an active region meet, and the largest amount of remaining carbon may be generated. Referring to FIG. 5, a large arrow in the middle portion thereof indicates that time or temperature is increasing.

This may be because reaction initiation in the active region is relatively fast. For example, gas of a binder generated due to reaction in the active region during firing may be found to be discharged externally. The gas may be mainly discharged in portions of a capacitor body exposed externally without being covered by first and second external electrodes.

Since the cover regions have a lower reaction initiation temperature than that of the active region, the gas of such a binder may be not easily discharged through upper and lower portions of the cover regions, and may be mainly discharged in a longitudinal direction of the capacitor body. The largest amount of gas may be discharged at an interface between the active region and the cover regions, in which structure is vulnerable in the highest degree.

Therefore, cracking may easily occur between the active region and the cover regions, when a firing step proceeds at a relatively high temperature in a state from which portion of gas is not discharged.

In this embodiment, a second binder used for the inner electrodes in the cover regions may be included to secure a gas discharge portion, composed of a plurality of holes, in the cover regions.

Therefore, gas remaining in the second binder and gas of the first binder may be discharged through the gas discharge portion during the firing step in the manufacturing process of the multilayer capacitor.

This may be because, unlike the conventional cover region, the second binder of this embodiment reacts in the firing step, holes for discharging gas in the form of a void may be formed in a space occupied by and removed the second binder, and the hole may function as a gas discharge portion.

When the gas discharge portion is formed in the cover regions, gas accumulated in the cover regions may be discharged before the gas is heated to a temperature of, for example, 800 to 1,000° C. or higher, thereby preventing cracks between the active region and the cover regions.

EXPERIMENTAL EXAMPLE

Table 1 below illustrated the results obtained by making ceramic sheets using a first binder or a second binder and measuring thermal decomposition temperature of each of the ceramic sheets with TG-DTA. Sample 1 was a ceramic sheet comprising 100% of a first binder, Sample 2 was a ceramic sheet in which a first binder and a second binder were mixed at a ratio of 7:3 (first binder:second binder), Sample 3 was a ceramic sheet in which a binder and a second binder were mixed at a ratio of 8:2 (first binder:second binder), and Sample 4 was a ceramic sheet to which a compatibilizer for improving dispersibility was further added.

TABLE 1

| | Sample 1 | Sample 2 | Sample 3 | Sample 4 |
|---|---|---|---|---|
| Thermal Decomposition Start Temp. (° C.) | 379.8 | 352.9 | 362.3 | 355.6 |

The thermal decomposition temperature may be an important factor playing various roles in a firing step.

Referring to Table 1, thermal decomposition started at 379.8° C. for Sample 1 made of 100% of the first binder. However, it can be seen that, in cases of Sample 2 to Sample 4 including the second binder, thermal decomposition started at a relatively low temperature, as compared to Sample 1.

Table 2 below illustrated the results obtained by using ceramic sheets of Table 1 as each sample to prepare stacked bodies having no internal electrodes and having length*width*height of 10 mm*5 mm*5 mm, and measuring thermal decomposition temperature of each of the ceramic sheets with TG-DTA. That is, Table 2 below illustrated experiments confirming how much carbons remaining in the stacked bodies of Samples 6 to 8 are discharged, compared to that of Sample 5.

TABLE 2

| | Sample 5 | Sample 6 | Sample 7 | Sample 8 |
|---|---|---|---|---|
| Thermal Decomposition Initiation Temp. (° C.) | 262.6 | 260.4 | 261.4 | 243.7 |
| Amount of Remaining Gas (%) | 84.26 | 81.38 | 81.45 | 80.74 |

Referring to Table 2, it can be seen that, in cases of Samples 6 to 8, when a firing step was proceeded, and thermal decomposition behavior was checked, thermal decomposition initiation temperature became low and remaining carbons became also low, as compared with Sample 5.

That is, when a second binder was contained in the stacked bodies, the thermal decomposition initiation temperatures were lowered, and a plurality of pores having voids were formed in the stacked bodies. Therefore, gas in the stacked bodies may be more easily discharged to reduce an amount of gas remaining in the stacked bodies.

Table 3 below illustrated the results obtained by using ceramic sheets of Table 2 to form cover regions, preparing stacked bodies having internal electrodes and having length*width*height of 10 mm*5 mm*5 mm, and performing 8585 reliability experiment thereon. In this case, 400 samples were tested for Sample 9, and 800 samples were tested for Sample 10, Sample 11, and Sample 12, respectively.

Sample 9 used the ceramic sheet of Sample 1, Sample 10 used the ceramic sheet of Sample 2, Sample 11 used the ceramic sheet of Sample 3, and Sample 12 used a ceramic sheet obtained by further including outer covers respectively externally disposed on an upper surface and a lower surface of each of the cover regions.

TABLE 3

| Experiment | Sample 9 | Sample 10 | Sample 11 | Sample 12 |
|---|---|---|---|---|
| 8585 | 2 failures | 10 failures | 2 failures | 0 failure |

Referring to Table 3, in the 8585 experiment, failures occurred in Sample 9, and the number of failures in Sample 10 was increased more than that in Sample 9. This was because, in a case of the sample 10, a plurality of holes were formed in the cover regions, and penetration of moisture and foreign matter through such holes was further facilitated.

It was confirmed that the number of failures in a case of Sample 11 was reduced in the 8585 experiment. This was because an amount of the first binder contained in the cover regions of Sample 11 was greater than that of the sample 10, and the number of holes formed in the cover regions of Sample 11 was less than that of Sample 9.

Further, in the case of Sample 12 in which the outer cover was further respectively externally disposed on an upper surface and a lower surface of each of the cover regions, no failure was observed in the 8585 experiment.

According to an embodiment of the present disclosure, since a second binder having a relatively low thermal decomposition temperature for use in an internal electrode is included in a cover region of a capacitor body, and in a firing process, the second binder forms a gas discharge portion in a cover region, there may be an effect that gas remaining inside of a stacked body may be easily discharged through the gas discharge portion to reduce cracks generated between an active region and a cover region of the capacitor body.

While example embodiments have been shown and described above, it will be apparent to those skilled in the art that modifications and variations could be made without departing from the scope of the present disclosure as defined by the appended claims.

What is claimed is:

1. A multilayer capacitor comprising:
a capacitor body including a first surface and a second surface opposing each other, a third surface and a fourth surface connected to the first and second surfaces and opposing each other, and a fifth surface and a sixth surface connected to the first and second surfaces, connected to the third and fourth surfaces, and opposing each other; including an active region including a plurality of dielectric layers and a plurality of first and second internal electrodes alternately disposed with the dielectric layers interposed therebetween, and cover regions disposed on an upper surface and a lower surface of the active region; and having one end of each of the first and second internal electrodes exposed through the third and fourth surfaces, respectively;
first and second external electrodes respectively disposed on the third and fourth surfaces of the capacitor body; and
outer covers respectively externally disposed on an upper surface and a lower surface of each of the cover regions,
wherein each of the cover regions has a plurality of holes,
wherein the plurality of holes are a gas discharge portion arranged in each of the cover regions such that all regions of the capacitor body disposed on both side surfaces of the active region are devoid of the gas discharge portion, and
wherein the outer covers are devoid of the gas discharge portion.

2. The multilayer capacitor according to claim 1, wherein a density of holes in each of the cover regions is greater than a density of holes in the plurality of dielectric layers in the active region.

3. The multilayer capacitor according to claim 1, wherein each of the first and second external electrodes comprises:
a first connection portion and a second connection portion respectively disposed on third and fourth surfaces of the capacitor body and respectively connected to the first and second internal electrodes; and
a first band portion and a second band portion respectively extending from the first and second connection portions to a portion of the first surface of the capacitor body.

4. A manufacturing method of a multilayer capacitor, comprising:

a first step of forming a plurality of electrode patterns including a first conductive pattern and a second conductive pattern on a first ceramic sheet including a first binder at regular intervals in a longitudinal direction;
a second step of stacking the first ceramic sheet on which the electrode patterns are formed, in plural, such that the first and second conductive patterns are alternated with each other in a thickness direction to prepare a first stacked body;
a third step of stacking a second ceramic sheet including the first binder and a second binder, having a thermal decomposition temperature lower than that of the first binder and used in the electrode pattern, on upper and lower surfaces of the first stacked body, to prepare a second stacked body having a cover region;
a fourth step of, after the third step, further stacking the first ceramic sheet in plural on an upper surface of an upper cover region, and further stacking the first ceramic sheet in plural on a lower surface of a lower cover region, to form outer covers, respectively;
a fifth step of cutting and firing each region of the second stacked body corresponding to a single capacitor, to prepare a capacitor body, in which a portion having the second conductive pattern with reference to a cut surface of the electrode patterns becomes a second internal electrode exposed from one end surface of the second stacked body, a portion having the first conductive pattern with reference to another cut surface of the electrode patterns becomes a first internal electrode exposed from another end surface of the second stacked body, and the first and second internal electrodes are alternately exposed from both end surfaces of the second stacked body; and
a sixth step of forming first and second external electrodes on both end surfaces of the capacitor body to be respectively electrically connected to the exposed portions of the first and second internal electrodes,
wherein, in the fifth step, the cover region is configured to perform a reaction with and remove the second binder, during firing, to form a plurality of holes in a space occupied by the second binder, and to discharge gas remaining in the first binder through the plurality of holes,
wherein the plurality of holes are a gas discharge portion, and
wherein the outer covers are devoid of the gas discharge portion.

5. The manufacturing method according to claim 4, wherein, in the third step, the second ceramic sheet has a content of the second binder greater than a content of the first binder.

* * * * *